(12) United States Patent
Liu et al.

(10) Patent No.: US 11,032,402 B2
(45) Date of Patent: Jun. 8, 2021

(54) HINGE OF A MOBILE TERMINAL HAVING AN INWARD-FOLDABLE FLEXIBLE SCREEN AND A MOBILE TERMINAL HAVING AN INWARD-FOLDABLE FLEXIBLE SCREEN

(71) Applicant: Hangzhou Amphenol Phoenix Telecom Parts Co., Ltd., Zhejiang (CN)

(72) Inventors: Xiaojie Liu, Zhejiang (CN); Caiqin Zhu, Zhejiang (CN)

(73) Assignee: HANGZHOU AMPHENOL PHOENIX TELECOM PARTS CO., LTD., Zhejiang (CN)

( * ) Notice: Subject to any disclaimer, the term of this patent is extended or adjusted under 35 U.S.C. 154(b) by 0 days.

(21) Appl. No.: 16/965,846

(22) PCT Filed: Jan. 31, 2019

(86) PCT No.: PCT/CN2019/074081
§ 371 (c)(1),
(2) Date: Jul. 29, 2020

(87) PCT Pub. No.: WO2019/149238
PCT Pub. Date: Aug. 8, 2019

(65) Prior Publication Data
US 2021/0044682 A1 Feb. 11, 2021

(30) Foreign Application Priority Data
Feb. 1, 2018 (CN) .......................... 201810101720.5

(51) Int. Cl.
*H04M 1/02* (2006.01)

(52) U.S. Cl.
CPC ....... *H04M 1/0216* (2013.01); *H04M 1/0268* (2013.01)

(58) Field of Classification Search
CPC .......................... H04M 1/0216; H04M 1/0268
See application file for complete search history.

(56) References Cited

U.S. PATENT DOCUMENTS

| 10,054,990 B1 * | 8/2018 | Harmon | ................ G06F 1/1679 |
| 10,104,790 B2 * | 10/2018 | Lee | ....................... H05K 5/0226 |
| 2013/0037228 A1 * | 2/2013 | Verschoor | ............. G06F 1/1652 |
| | | | 160/377 |

FOREIGN PATENT DOCUMENTS

| CN | 105491193 | * | 4/2016 |
| CN | 105491193 A | | 4/2016 |

(Continued)

*Primary Examiner* — Yuwen Pan
*Assistant Examiner* — Angelica M Perez
(74) *Attorney, Agent, or Firm* — Muncy, Geissler, Olds & Lowe, P.C.

(57) ABSTRACT

The present invention provides a mobile terminal having an inward-foldable flexible screen and its hinge comprises a left support plate, a middle support plate, a right support plate, a left support frame, a right support frame, and a central U-shaped cover; the middle support plate is a liftable plate whose position corresponds to the middle U-shaped cover, and the descent distance of the middle support plate in the first half of the hinge being folded from the unfolded state is greater than that of the second half of the hinge being folded from the unfolded state. The present invention can be used as the hinge of the mobile terminal with the flexible screen on the inside, and can quickly form the space for the flexible screen to be bent when folded, to avoid the flexible screen from being damaged, and to make the middle mechanism of the hinge not exposed after being folded.

9 Claims, 11 Drawing Sheets

(56) References Cited

FOREIGN PATENT DOCUMENTS

| | | | |
|---|---|---|---|
| CN | 20587346 | * | 12/2016 |
| CN | 205847346 U | | 12/2016 |
| CN | 206100081 | * | 4/2017 |
| CN | 206100081 U | | 4/2017 |
| CN | 108322567 A | | 7/2018 |
| WO | WO-2016117804 A | | 7/2016 |
| WO | WO 2016117804 A1 | * | 7/2016 |

\* cited by examiner

HINGE OF A MOBILE TERMINAL HAVING AN INWARD-FOLDABLE FLEXIBLE SCREEN AND A MOBILE TERMINAL HAVING AN INWARD-FOLDABLE FLEXIBLE SCREEN

TECHNICAL FIELD

The invention relates to a mobile terminal and its hinge.

BACKGROUND

Flexible screen is an emerging screen. For the mechanical structure of a mobile terminal having a flexible screen, it is necessary to solve how to support the flexible screen to adapt to the bending characteristics of the flexible screen when the mobile terminal is closed, so that the flexible screen can be applied to the mobile terminal.

SUMMARY

The first technical problem to be solved by the present invention is to provide a hinge of a mobile terminal having an inward-foldable flexible screen, which can be used as a hinge for a mobile terminal with a flexible screen at the inner side, and can quickly form a space for the flexible screen to bend when folding, so as to avoid the damage of the flexible screen. To this end, the present invention adopts the following technical solutions:

A hinge of a mobile terminal having an inward-foldable flexible screen, wherein it comprises a left support plate, a middle support plate, a right support plate, a left support frame, a right support frame, and a middle U-shaped cover;

The inner ends of the left support frame and the right support frame are connected with a synchronous mechanism, so that the left support frame and the right support frame can rotate synchronously and reversely;

The middle support plate is a liftable plate with the position corresponding to the middle U-shaped cover, and the middle support plate descends to the bottom of the middle U-shaped cover; the middle support plate is not connected with the left support plate or the right support plate, and a left guide drive mechanism and a right guide drive mechanism are respectively arranged between the left support frame and the middle support plate, and between the right support frame and the middle support plate; the rotation of the left support frame and the right support frame forces the middle support plate to make corresponding ascending or descending movement through the left guide drive mechanism and the right guide drive mechanism, and the descent distance of the middle support plate in the first half of the hinge being folded from the open and flattened state is greater than that of the second half of the hinge being folded from the open and flattened state;

The left support plate is movably connected between the left support frame and the middle U-shaped cover, and the right support plate is movably connected between the right support frame and the middle U-shaped cover;

The left support plate, the middle support plate and the right support plate form the middle support plane of the flexible screen when the hinge opens to the unfolded state, and form a bent configuration after the hinge is folded to provide space for the flexible screen to bend.

Further, the left guide drive mechanism and the right guide drive mechanism each comprises a guide drive groove and a pin cooperated with the guide drive groove.

Furthermore, the left support plate and the right support plate are telescopic components, which are respectively rotatably connected with the left support frame and the right support frame at the outer ends, and at the inner ends, are respectively rotatably connected with the portions at the middle U-shaped cover at which is away from the rotation centers of the left support frame and the right support frame; the distance between the rotation centers of the inner ends and the outer ends of the left support plate and the right support plate is variable during the unfolding and folding of the hinge.

Furthermore, the rotation centers of the outer ends of the left support plate and the right support plate are respectively located at the height of the flexible screen above the left support and the right support plate.

Furthermore, the left support plate and the right support plate respectively comprise a flexible screen support plate and a connection plate, and the flexible screen support plate and the connection plate are slidably connected; one end of the flexible screen support plates of the left support plate and the right support plate are respectively rotatably connected with the left support frame and the right support frame, and one end of the connection plates of the left support plate and the right support plate are respectively rotatably connected with the U-shaped cover in the middle.

Furthermore, a spring mechanism is connected between the flexible screen support plate and the connection plate of the left support plate, and between the flexible screen support plate and the connection plate of the right support plate, so that the spring energy storage stage is at the beginning stage of which the hinge is closed from the unfolded state to the folded state, and at the beginning stage of which the hinge is opened from the folded state to the unfolded state, and in the later stage, the spring changes from energy storing to potential energy releasing, so that the hinge is automatically opened or folded in the energy release stage.

Furthermore, the hinge is provided with structures for stopping the rotation and positioning at any time at the inner ends of the left support frame and the right support frame.

Furthermore, both ends of the middle U-shaped cover are respectively connected to the shell of the synchronous mechanism at the corresponding end through a connection structure, and the left support frame and the right support frame are provided with concession holes for giving way to the connection structure for the left support frame and the right support frame to rotate.

Another technical problem to be solved by the present invention is to provide a mobile terminal having an inward-foldable flexible screen using the above hinge. Therefore, the present invention adopts the following technical solution:

A mobile terminal having an inward-foldable flexible screen, wherein the mobile terminal is provided with any of the above hinges, and the flexible screen is laid on the inner side of the hinge.

Due to the adoption of the technical solution of the present invention, the structure of the present invention is simple and reliable, can achieve the support of the inward-foldable flexible screen, adapt to the bending requirement of the inward-foldable flexible screen when closing, provide more space for the flexible screen to bend, and make the middle mechanism of the hinge not exposed after being closed, and can quickly lower the middle support plate in the initial stage of closing from the unfolded state to rapidly form an avoidance space to avoid the flexible screen and prevent the screen from being damaged by extrusion. When the hinge is applied to mobile terminals such as mobile phones, e-books, laptops, etc., the hinge can not only be used as the hinge, but also as the support structure of the flexible screen. When the mobile phones and laptops are opened and closed, the flexible screen can be freely unfolded and bent, so that the flexible screen can be used in mobile terminals such as mobile phones, e-books, laptops, etc., and the mobile terminals can be realized large-screen display in a small volume.

BRIEF DESCRIPTION OF THE DRAWINGS

FIGS. 2-1 and 2-2 are respectively a schematic diagram of the mobile terminal having an inward-foldable flexible screen and applying the hinge of the present invention in the open and flattened state and a schematic diagram of the middle structure.

FIGS. 3-1 and 3-2 are respectively a schematic diagram of the mobile terminal having an inward-foldable flexible screen and applying the hinge of the present invention in the folded state and a schematic diagram of the middle structure.

FIGS. 4-1 and 4-2 are sectional views of the mobile terminal having an inward-foldable flexible screen and applying the hinge of the present invention in the open and flattened state and the folded state respectively.

FIGS. 5-1 and 5-2 are enlarged views of FIGS. 4-1a and 4-2b respectively.

DETAILED DESCRIPTION

Figure 1:
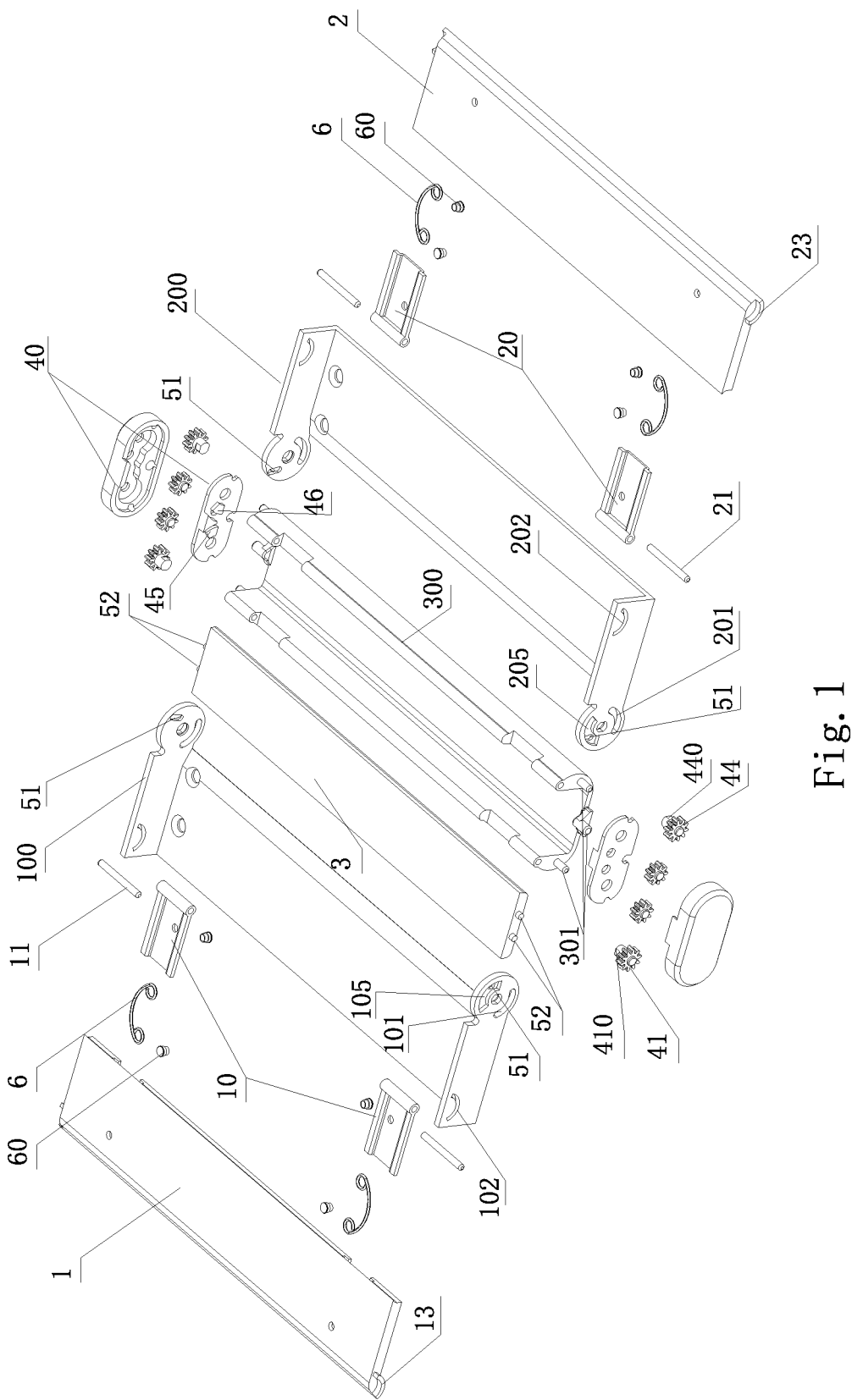
FIG. 1 is an exploded view of an embodiment of the hinge of the present invention.
Figure 2:
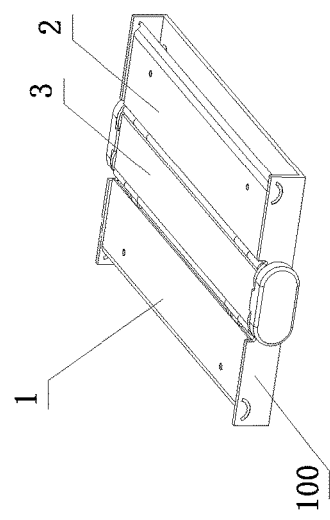
Figures 2, 3:
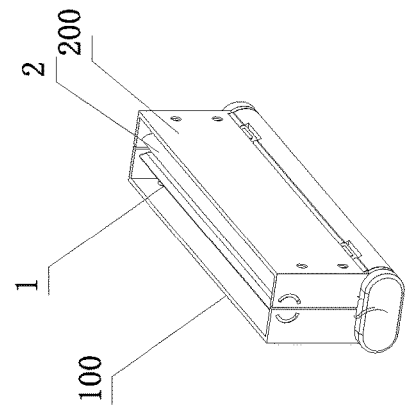
Figures 1, 2:
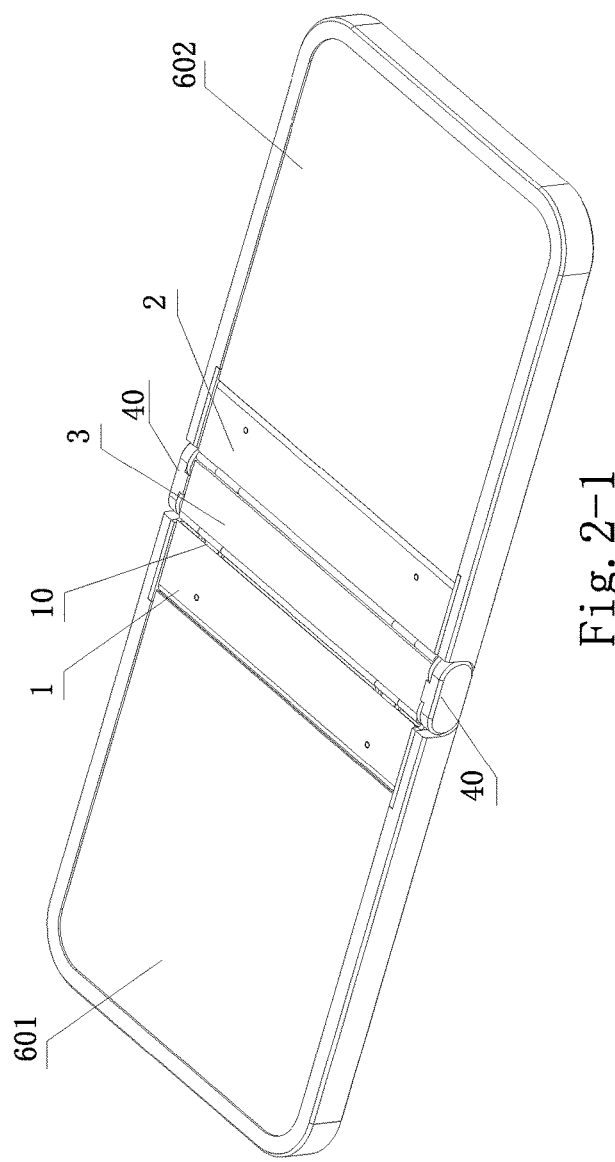
Figures 1, 3:
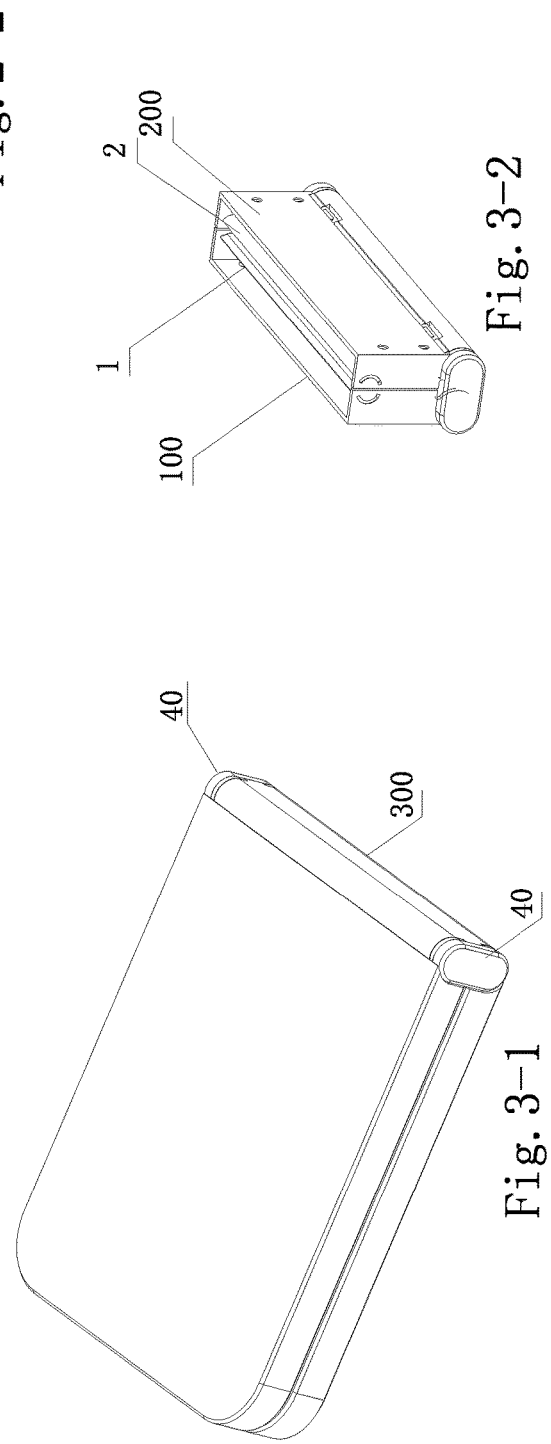
Figures 1, 4:
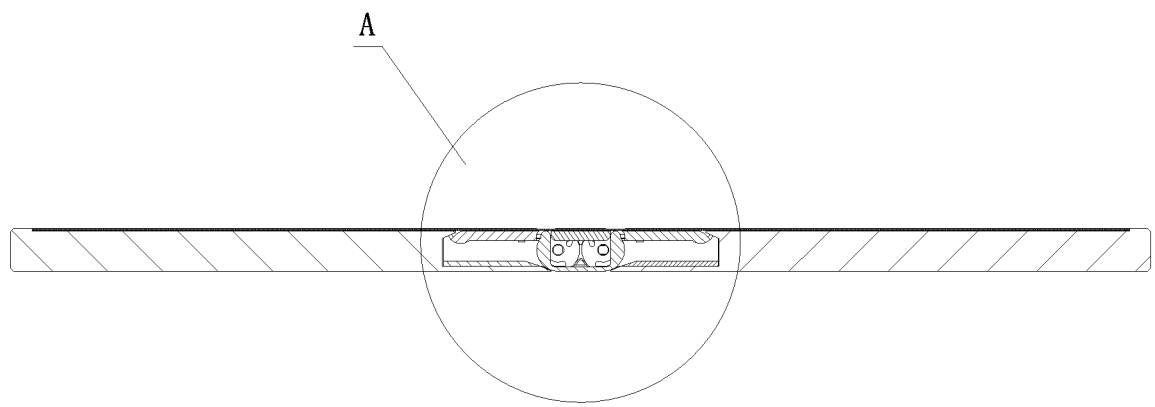
Figures 2, 4:
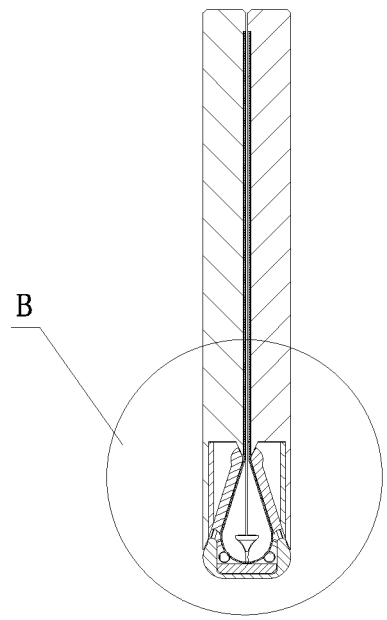
Figures 1, 5:
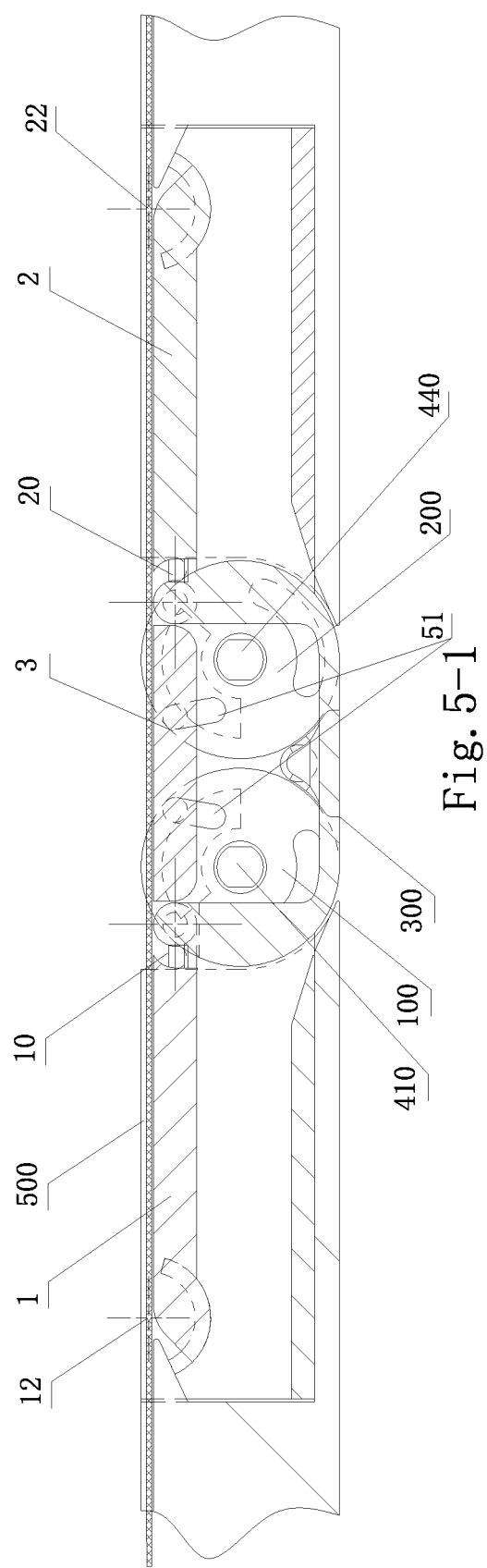
Figures 2, 5:
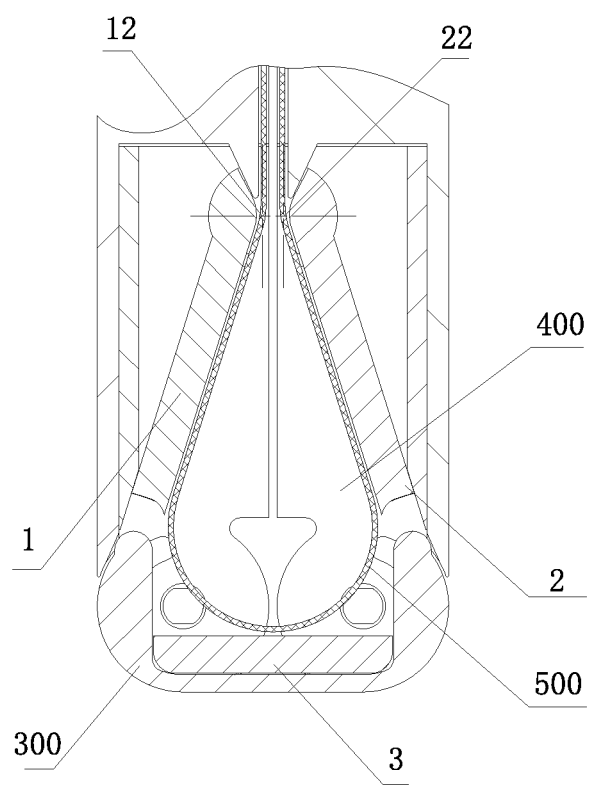
Figure 6:
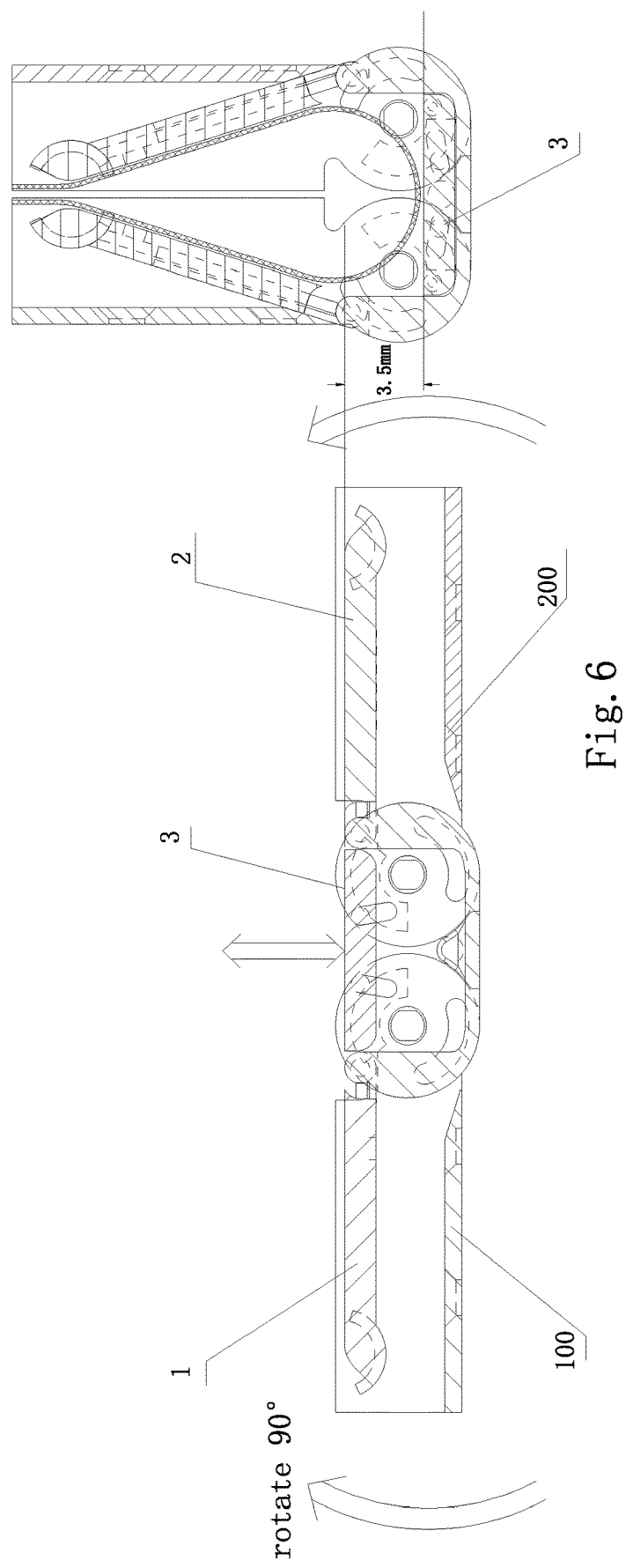
FIG. 6 is a sectional view of the descending distance of the middle support plate of the mobile terminal having an inward-foldable flexible screen and applying the hinge of the present invention from the open and flattened state to the folded state.
Figure 7:
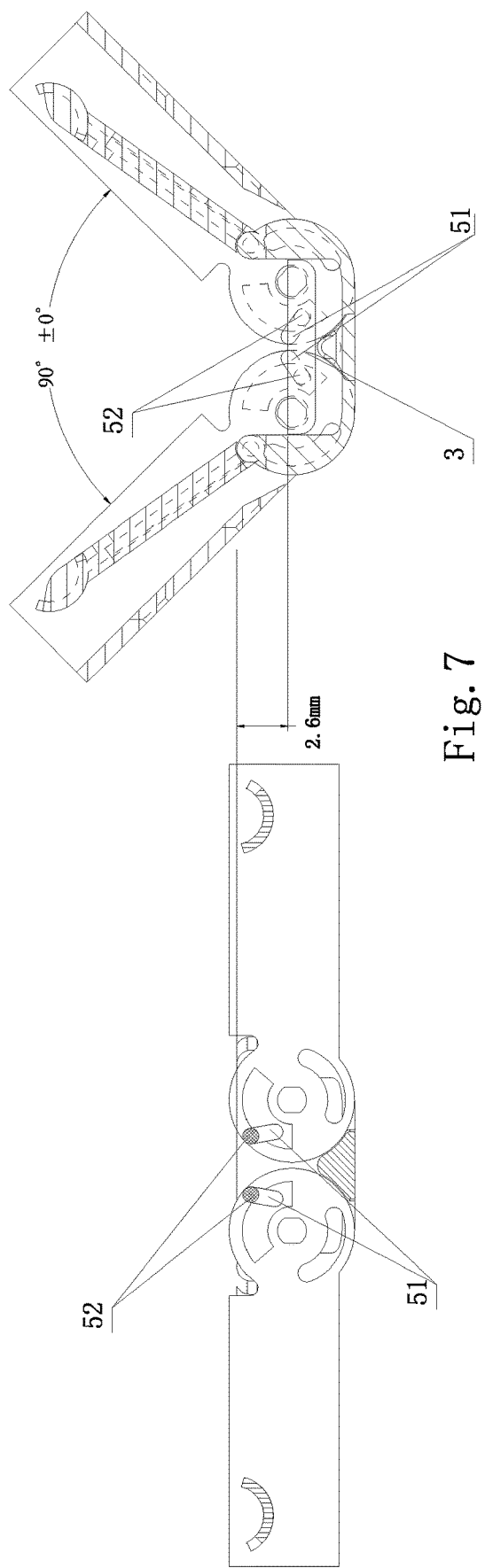
FIG. 7 is a sectional view of the descending distance of the middle support plate of the mobile terminal having an inward-foldable flexible screen and applying the hinge of the present invention from the open and flattened state to the half opened state.
Figure 8:
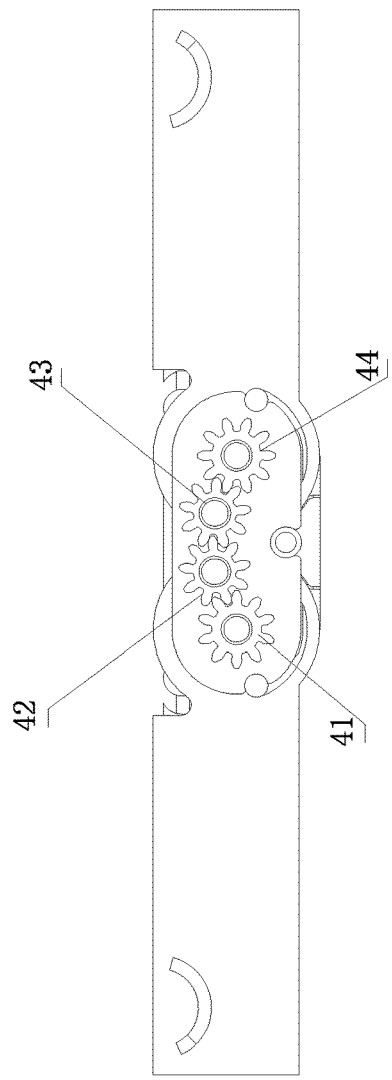
FIG. 8 is a schematic diagram showing a synchronization structure in the present invention.
Figure 10:
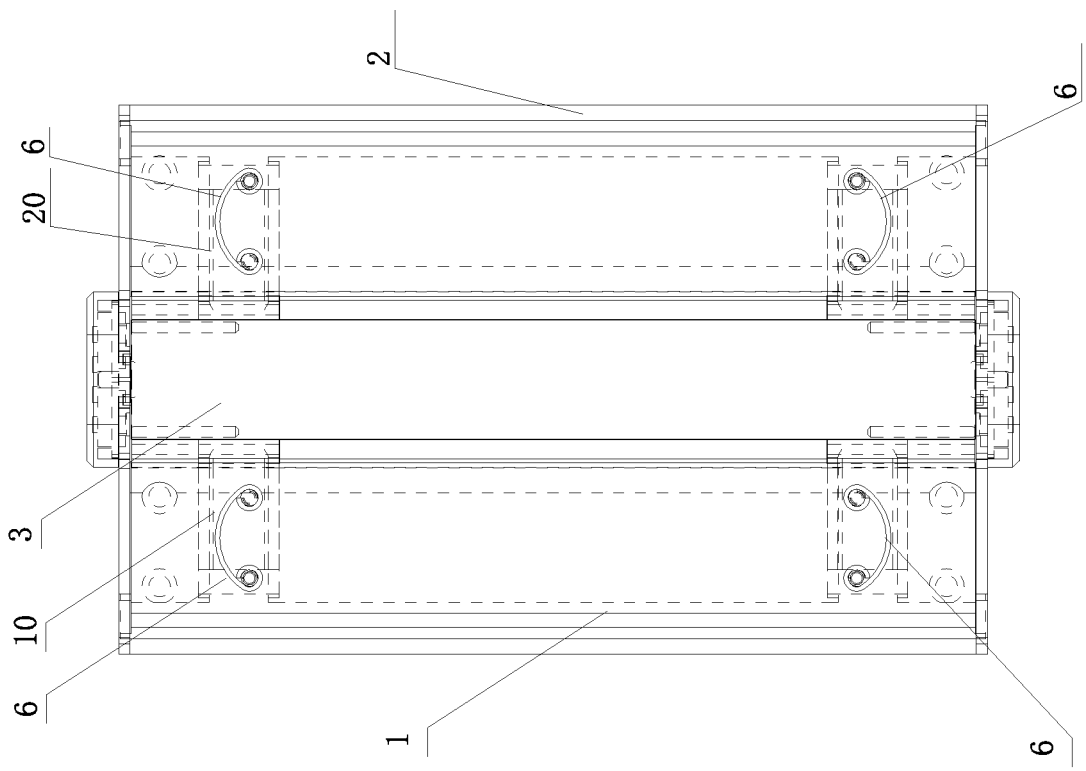
FIG. 10 is a schematic diagram of the combination of the left support plate, the right support plate and the middle U-shaped cover.
Figure 9:
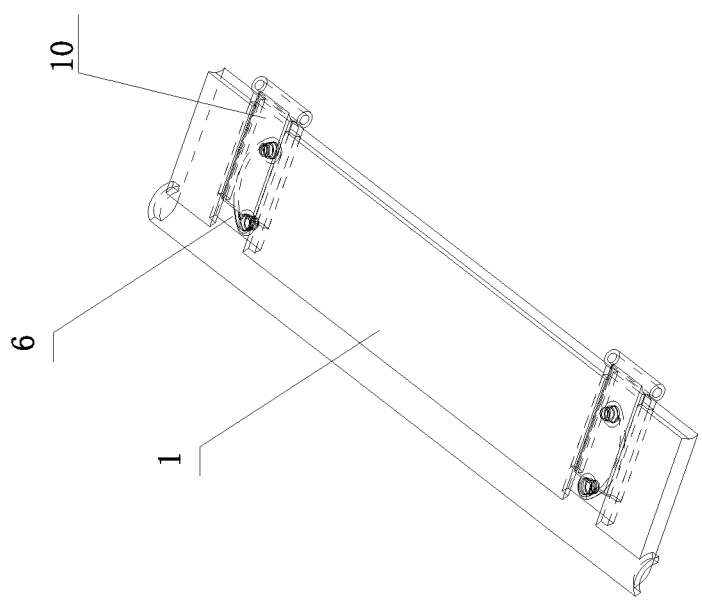
FIG. 9 is a schematic diagram of the left support plate assembly.
Figure 11:
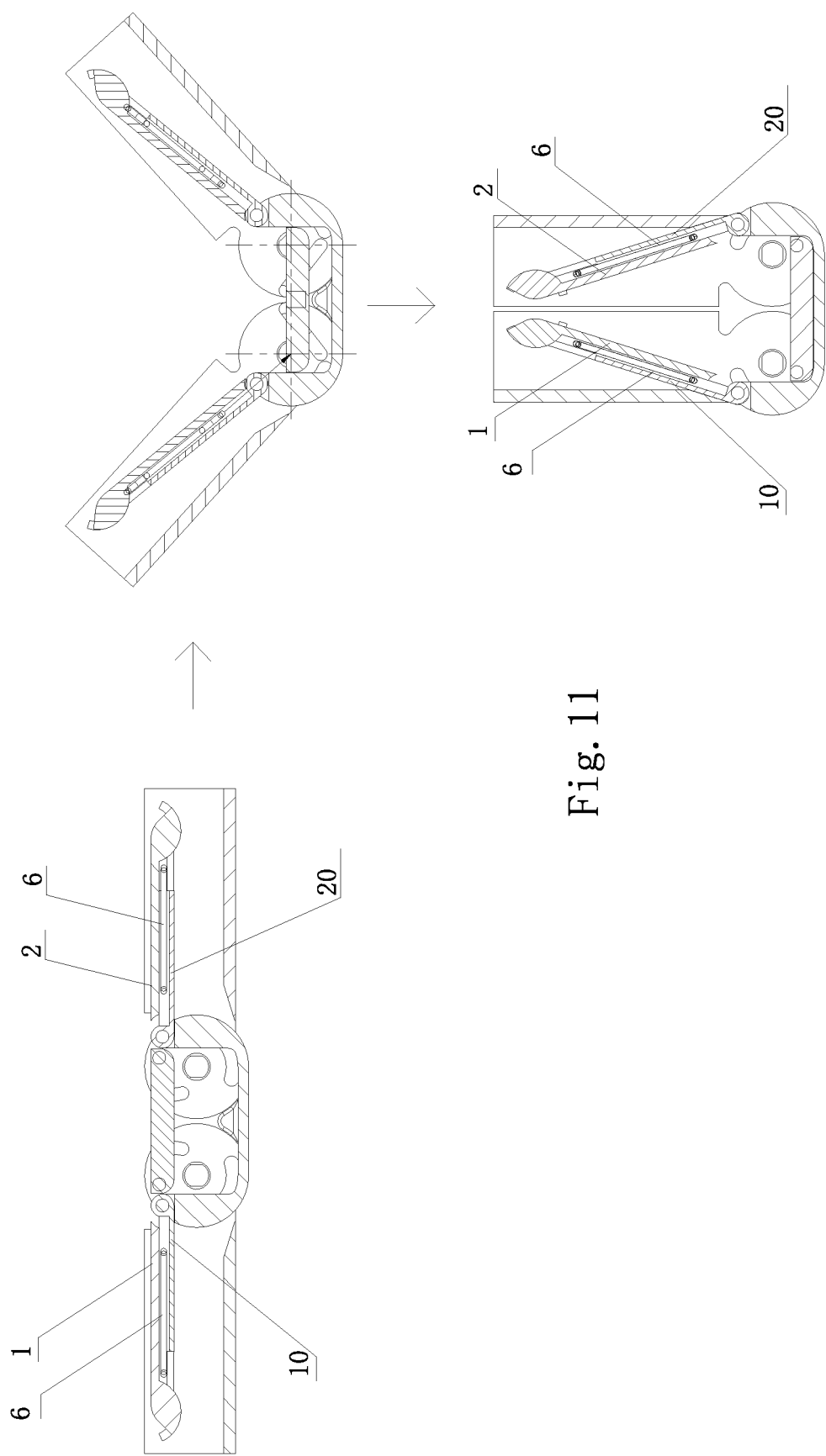
FIG. 11 is a sectional view of the hinge provided by the present invention from the open and flattened state to the half opened state and then to the folded state, showing the telescopic changes of the left support plate and the right support plate.

Refer to the attached figures. The hinge of the mobile terminal having an inward-foldable flexible screen comprises a left support plate, a middle support plate 3, a right support plate, a left support frame 100, a right support frame 200 and a middle U-shaped cover 300.

The inner ends of the left support frame 100 and the right support frame 200 are connected with the synchronous mechanism, so that the left support frame 100 and the right support frame 200 can rotate synchronously and reversely, and the rotation speed of the left support frame 100 and the right support frame 200 is basically the same.

The synchronous mechanism can adopt a gear mechanism, and the gear mechanism may comprise gears 41, 42, 43 and 44 that are meshed in sequence. The shaft 410 of the gear 41 and the shaft 440 of the gear 44 are respectively connected with the inner ends of the left support frame 100 and the right support frame 200, and the gears 41 and 44 can also be directly formed on the left support frame 100 and the right support frame 200. The hinge is provided with a mounting shell 40 on the outer side of the inner end of the left support 100 and the right support frame 200, and the gears 41, 42, 43 and 44 are installed in the mounting shell 40; the two ends of the middle U-shaped cover 300 are respectively connected with the mounting shell 40 at the corresponding ends through the positioning pins 301, and the left support frame 100 and the right support frame 200 are provided with concession holes 101 and 201 for giving way to the positioning pin 301 of the middle U-shaped cover for the left support frame and the right support frame to rotate.

The shaft 410 of the gear 41 and the shaft 440 of the gear 44 also pass through the inner plate of the mounting shell 40, so that the mounting shell 40 can naturally obtain the result of non-rotation, while a rotation limit structure of the left support frame 100 and the right support frame 200 can be provided between the inner plate, the left support bracket 100 and the right support frame 200. The rotation limit structure can comprise limit blocks of rotation ranges 45 and 46 for the left support frame 100 and the right support frame 200, while the left support frame 100 and the right support frame 200 are provided with limit grooves 105 and 205 cooperated with the limit blocks 45 and 46. When the left support 100 and the right support frame 200 are opened and flattened, they will be limited and cannot continue to rotate.

The left support plate, the middle support plate 3 and the right support plate form the middle support plane of the flexible screen when the hinge opens to the unfolded state, and form a bent configuration after the hinge is folded to provide space 400 for the flexible screen to bend.

The middle support plate 3 is a liftable plate whose position corresponds to the middle U-shaped cover 300, and the middle support plate 3 descends to the bottom of the middle U-shaped cover 300. In the present invention, the middle support plate 3 is not connected with the left support plate or the right support plate, and is independent of the movement of the left support plate and the right support plate, so that it can be quickly descended without interference with the left support plate and the right support plate, and the space 400 for the flexible screen 500 to bend can be rapidly formed. A left guide drive mechanism and a right guide drive mechanism are respectively arranged between the left support frame 100 and the middle support plate 3, and between the right support frame 200 and the middle support plate 3, so as to drive and guide the rising and falling of the middle support plate 3, and make the middle support plate 3 obtain the support from the left support frame 100 and the right support frame 200 when the hinge is opened and flattened. The rotation of the left support frame 100 and the right support frame 200 forces the middle support plate to move up or down correspondingly through the left guide drive mechanism and the right guide drive mechanism, besides, while the middle support plate 3 is driven and guided by the left guide drive mechanism and the right guide drive mechanism, the descent distance of which during the first half of the process of the hinge being folded from the unfolded state, that is, the descent distance from the 180° opening state to the 90° opening state, is greater than that during the second half, that is, the descent distance from the 90° opening state to the closed state.

The structure of the left guide drive mechanism and the right guide drive mechanism is generally symmetrical.

The left guide drive mechanism and the right guide drive mechanism each comprises a guide drive groove 51 and a pin 52 cooperated with the guide drive groove 51; the guide drive grooves 51 are preferably located at the end of the left support frame 100 and the right support frame 200, and the pins 52 are at the end of the middle support plate 3. The guide drive grooves 51 of the left support frame 100 and the right support frame 200 adopt a large pressure angle design, so as to realize the rapid drop of the middle support plate 3 at the beginning of rotation, and provide enough space for the flexible screen to bend and avoid the flexible screen from being damaged by compression. Taking the hinge in the unfolded state as the reference position, the guide drive groove 51 is a substantially steep chute, and the upper end of the chute is closer to the middle of the hinge. The radius between the upper end of the chute and its respective rotation center is greater than the distance from the lower end to the respective rotation center, so that when the hinge is from the open and flattened state to folded state, the middle support plate 3 presents fast descent speed and long descent distance in the first half of the descending, and slow descent speed and short descent distance in the second half of the descending, while from the folded state to the open and flattened state, the middle support plate 3 presents a mirrored motion, i.e., the initial ascent speed is slow and the ascent distance is short, while in the second half, the ascent speed is fast and the ascent distance is large.

Taking this embodiment as an example, in the process of closing from the 180° open and flattened state to the 90° state, the middle support plate 3 descends 2.6 mm, accounting for about ¾ of the total descending height, and the remaining 90° achieves the remaining ¼ of the rotation. In this way, the initial rapid descent can quickly form the space 400, avoiding the flexible screen and preventing the screen from being damaged by crushing.

The left support plate 1 is movably connected between the left support frame 100 and the middle U-shaped cover 300, and the right support plate 2 is movably connected between the right support frame 200 and the middle U-shaped cover 300.

The left support plate and the right support plate are telescopic components, which are respectively rotatably connected with the left support frame 100 and the right support frame 200 at the outer ends, and at the inner ends, are respectively rotatably connected with the portions at the middle U-shaped cover 300 at which is away from the rotation centers of the left support frame and the right support frame; the distance between the rotation centers of the inner ends and the outer ends of the left support plate and the right support plate is variable during the unfolding and folding of the hinge.

The left support plate and the right support plate respectively comprise the flexible screen support plates 1 and 2 and the connecting plates 10 and 20; the flexible screen support plate 1 and the connecting plate 10 are slidably connected, and the flexible screen support plate 2 and the connecting plate 20 are slidably connected. One end of the flexible screen support plate 1 is rotatably connected with the left support frame 100, and one end of the flexible screen support plate 2 is rotatably connected with the right support frame 200; one end of the connecting plate 10 is rotatably connected with the middle U-shaped cover 300, and one end of the connecting plate 20 is rotatably connected with the middle U-shaped cover 300. The number of connecting plates 10 and 20 is preferably two.

The reference numbers 11 and 21 of the drawings are the shaft of the connecting plate 10 and the middle U-shaped cover 300, and the shaft of the connecting plate 20 and the middle U-shaped cover 300, respectively. The rotation centers 12 and 22 of the flexible screen support plate 1 of the left support plate and the flexible screen support plate 2 of the right support plate are respectively at the height of the flexible screen above the left support plate and the right support plate, which are virtual centers. The left support frame and the right support frame are respectively provided with arc grooves 102 and 202, and the center of the arc groove is above the outside of the left support plate and the right support plate; the flexible screen support plate 1 and the flexible screen support plate 2 are respectively provided with guide keys 13 and 23 matching with arc grooves 102 and 202. In this way, the flexible screen 500 is adhered to the flexible screen support plates 1 and 2. When the flexible screen support plates 1 and 2 rotate, the flexible screen will hardly be stretched or compressed, thus improving the service life of the flexible screen.

A spring mechanism is connected between the flexible screen support plate 1 and the connecting plate 10, and between the flexible screen support plate 2 and the connecting plate 20, so that the spring energy storage stage is at the beginning stage of which the hinge is closed from the unfolded state to the folded state, and at the beginning stage of which the hinge is opened from folded state to the unfolded state, and in the later stage, the spring changes from energy storing to potential energy releasing, so that the hinge is automatically opened or folded in the energy release stage, thereby giving the mobile terminal having a flexible screen a semi-automatic opening and closing function, or playing the role of counteracting the rebound force when the flexible screen is bent.

The spring mechanism can adopt a torsion spring 6 or a compression spring or a tension spring, and the compression spring or the tension spring is connected with two relatively slidable spring frames which are respectively connected with the flexible screen support plate and the connecting plate. In the embodiment, both ends of the torsion spring 6 are rotatably connected with the flexible screen support plate and the connecting plate through connectors. The two ends of the torsion spring 6 are in the form of a ring or an open ring, and the connectors can be rivets 60. The torsion spring 6 can be C-shaped, wavy line shaped, W-shaped, etc.

Figure 12:
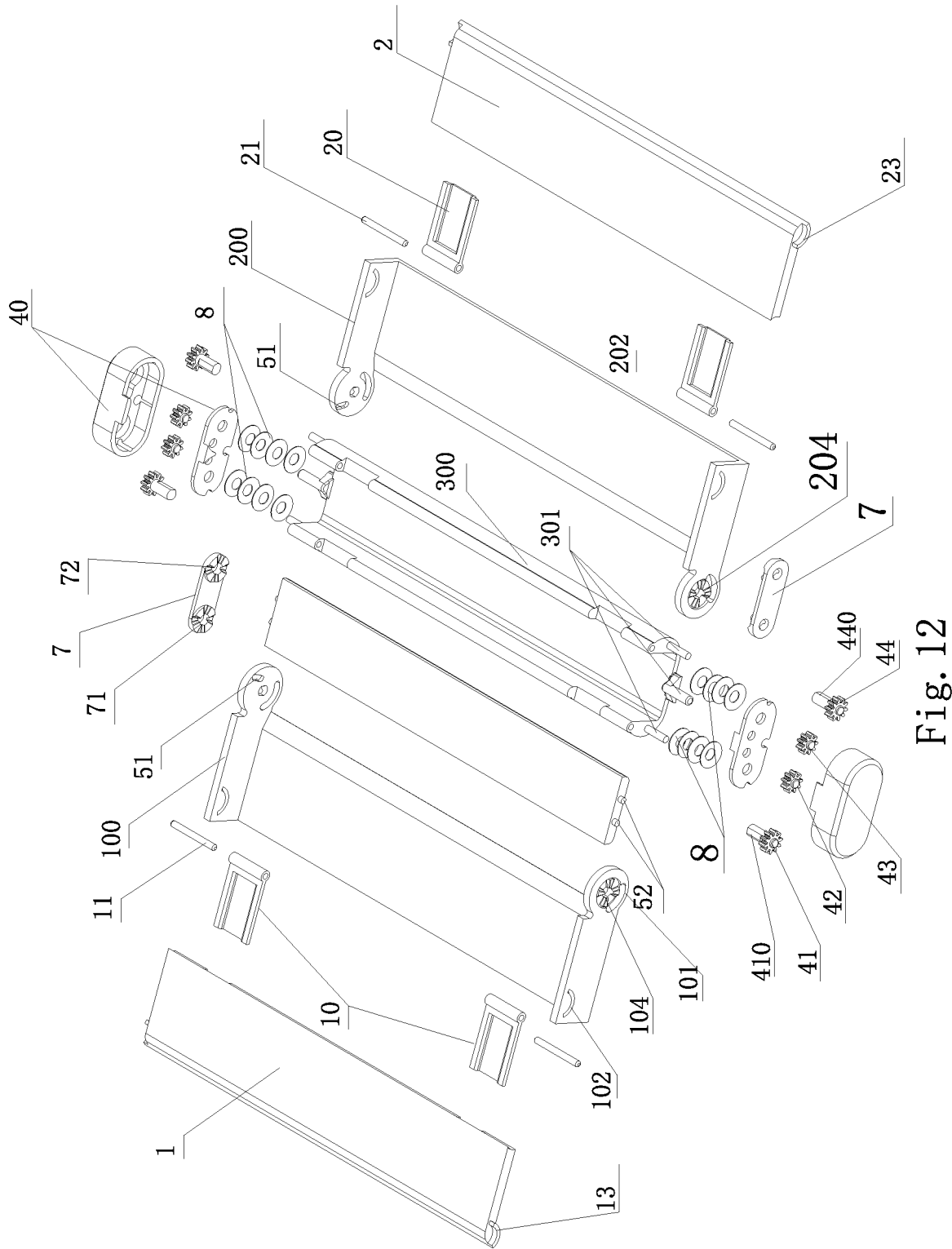
FIG. 12 is an exploded view of embodiment 2 of the present invention.
Figure 13:
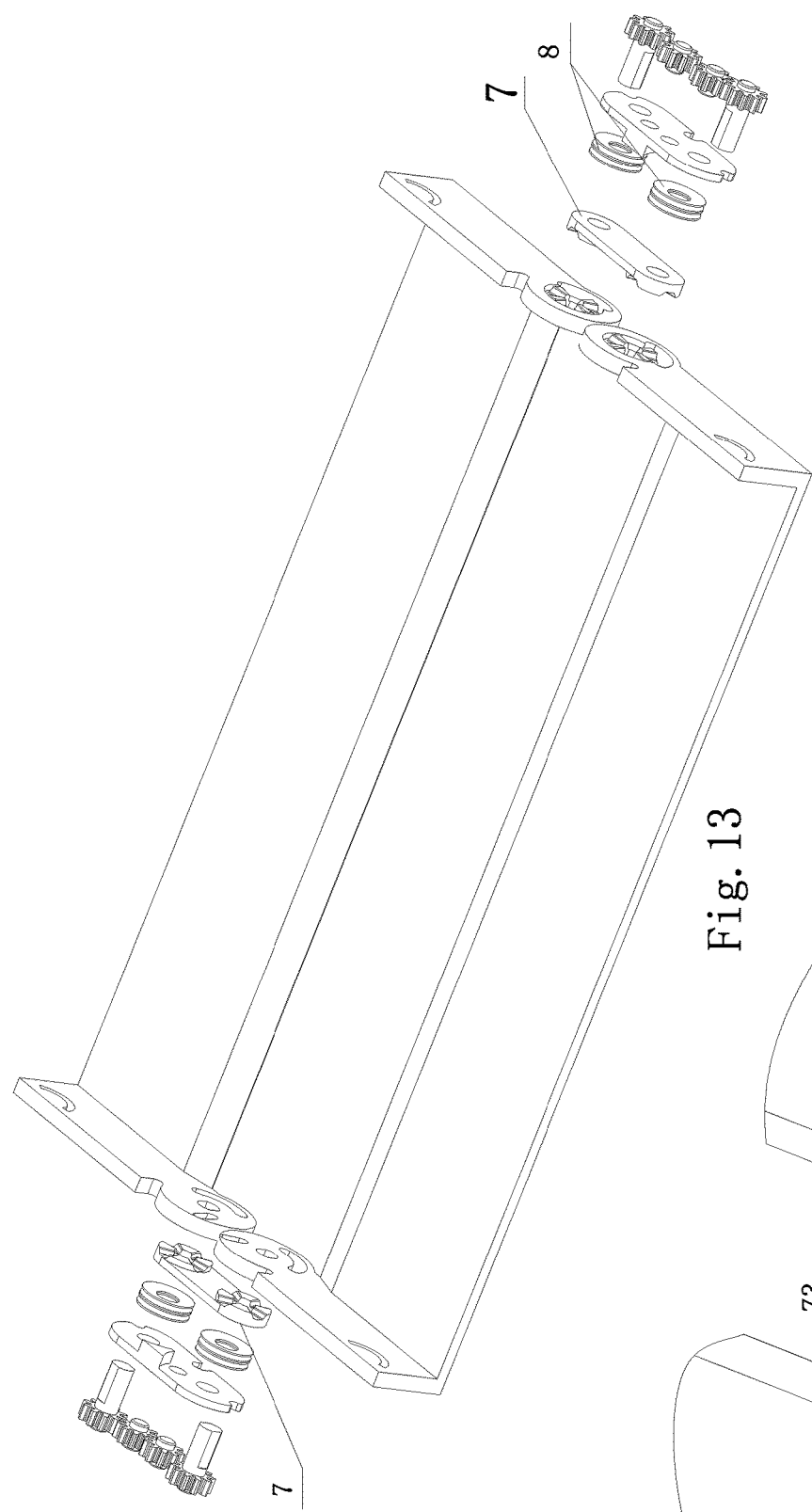
FIG. 13 is a structural exploded view of the functional portion that stops the rotation and locates the position at any time in the embodiment shown in FIG. 12.
Figure 14:
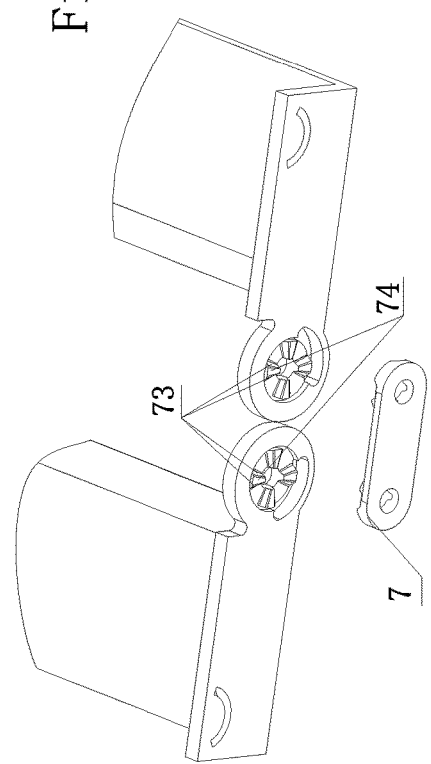
FIG. 14 is an enlarged view of the portion of the left support frame and the right support frame in the embodiment shown in FIG. 12.

Refer to FIGS. 12, 13 and 14. The hinge may not be the above-mentioned semi-automatic hinge, but the inner ends of the left support frame 100 and the right support frame 200 are provided with a structure that stops the rotation and locates the position at any time, providing the operation feeling of the hinge and providing the function of stopping the rotation and positioning at any time. The structure includes a non-rotatable cam 7 whose inner side is provided with a left cam surface 71 for the left support frame 100 and a right cam surface 72 for the right support frame 200, and the cam surfaces 104 and 204 that cooperate with the left cam surface 71 and the right cam surface 72 are arranged on the outer surface of the inner end of the left support frame 100 and the right support frame 200. The first gear shaft 410 and the fourth gear shaft 440 respectively pass through the cam 7, so that the cam 7 is positioned without rotation. Disc springs 8 are provided between the cam 7 and the gear box, and the disc springs 8 on the left and right sides are respectively sleeved on the first gear shaft 410 and the fourth gear shaft 440, tightening the left cam surface 71 and the cam surface 104, and tightening the right cam surface 72 and the cam surface 204, which generate friction between them for stopping the rotation and positioning at any time.

The cooperation between the left cam surface 71 and the cam surface 104, and between the right cam surface 72 and the cam surface 204 are preferably symmetrical. At the beginning and the end of the process of the hinge from the unfolded state to the folded state, the planes are cooperated in inclined state 73 (which compresses and releases the disc springs), and the other main parts are cooperated as flat planes 74 (without compression and release of the disc spring). In this way, the hinge is given the automatic reset function (i.e. the self-locking function of the state) at the beginning stage of opening from the folded state or folding from the unfolded state to avoid misoperation, and provide an automatic positioning function (i.e. self-locking function of the state) at the end of the stages.

In addition to the above friction structure, a torsion structure can also be used for the structure for stopping the rotation and positioning at any time. For example, to spring tube is used to wrap the shaft to perform the function of stopping the rotation and positioning at any time.

In this embodiment, the structures for stopping the rotation and positioning at any time are arranged at the inner ends of the left support frame 100 and the right support frame 200. Since they are the parts with the largest rotation angle range in the whole device, this helps to improve the sensitivity of the function of stopping the rotation and positioning at any time, and improves the operation feel. The structure for stopping the rotation and positioning at any time can also be arranged between other parts where relative rotation and sliding occur. In this embodiment, the reference numerals are the same as the drawings in embodiment 1, and mean the same.

For a mobile terminal applying the above hinge, taking a mobile phone as an example, the flexible screen 500 is laid on the inner side of the hinge and the inner side of the left main support plate 601 and the right main support plate 602 of the flexible screen. The left support frame 100 and the right support frame 200 can respectively be integrated with the left main support plate 601 and the right main support plate 602 of the flexible screen of the mobile terminal, or they can be separate components and fixed as one.

The above is only a specific embodiment of the present invention, but the structural features of the present invention are not limited to this. Any change or modification made by those skilled in the art in the field of the present invention is covered by the scope of protection of the present invention.

The invention claimed is:

1. A hinge of a mobile terminal having an inward-foldable flexible screen, wherein it comprises a left support plate, a middle support plate, a right support plate, a left support frame, a right support frame, and a middle U-shaped cover;

The inner ends of the left support frame and the right support frame are connected with a synchronous mechanism, so that the left support frame and the right support frame can rotate synchronously and reversely;

The middle support plate is a liftable plate with the position corresponding to the middle U-shaped cover, and the middle support plate descends to the bottom of the middle U-shaped cover; the middle support plate is not connected with the left support plate or the right support plate, and a left guide drive mechanism and a right guide drive mechanism are respectively arranged between the left support frame and the middle support plate, and between the right support frame and the middle support plate; the rotation of the left support frame and the right support frame forces the middle support plate to make corresponding ascending or descending movement through the left guide drive mechanism and the right guide drive mechanism, and the descent distance of the middle support plate in the first half of the hinge being folded from the unfolded state is greater than that of the second half of the hinge being folded from the unfolded state;

The left support plate is movably connected between the left support frame and the middle U-shaped cover, and the right support plate is movably connected between the right support frame and the middle U-shaped cover;

The left support plate, the middle support plate and the right support plate form the middle support plane of the flexible screen when the hinge opens to the flattened state, and form a bent configuration after the hinge is folded to provide space for the flexible screen to bend.

2. The hinge of a mobile terminal having an inward-foldable flexible screen according to claim 1, wherein the left guide drive mechanism and the right guide drive mechanism each comprises a guide drive groove and a pin cooperated with the guide drive groove.

3. The hinge of a mobile terminal having an inward-foldable flexible screen according to claim 1, wherein the left support plate and the right support plate are telescopic components, which are respectively rotatably connected with the left support frame and the right support frame at the outer ends, and at the inner ends, are respectively rotatably connected with the portions at the middle U-shaped cover at which is away from the rotation centers of the left support frame and the right support frame; the distance between the rotation centers of the inner ends and the outer ends of the left support plate and the right support plate is variable during the unfolding and folding of the hinge.

4. The hinge of a mobile terminal having an inward-foldable flexible screen according to claim 3, wherein the rotation centers of the outer ends of the left support plate and the right support plate are respectively located at the height of the flexible screen above the left support and the right support plate.

5. The hinge of a mobile terminal having an inward-foldable flexible screen according to claim 3, wherein the left support plate and the right support plate respectively comprise a flexible screen support plate and a connection plate, and the flexible screen support plate and the connection plate are slidably connected; one end of the flexible screen support plates of the left support plate and the right support plate are respectively rotatably connected with the left support frame and the right support frame, and one end of the connection plates of the left support plate and the right support plate are respectively rotatably connected with the U-shaped cover in the middle.

6. The hinge of a mobile terminal having an inward-foldable flexible screen according to claim 3, wherein a spring mechanism is connected between the flexible screen support plate and the connection plate of the left support plate, and between the flexible screen support plate and the connection plate of the right support plate, so that the spring energy storage stage is at the beginning stage of which the hinge is closed from the unfolded state to the folded state and at the beginning stage of which the hinge is opened from the folded state to the unfolded state, and in the later stage, the spring changes from energy storing to potential energy releasing, so that the hinge is automatically opened or folded in the energy release stage.

7. The hinge of a mobile terminal having an inward-foldable flexible screen according to claim 1, wherein the hinge is provided with structures for stopping the rotation and positioning at any time at the inner ends of the left support frame and the right support frame.

8. The hinge of a mobile terminal having an inward-foldable flexible screen according to claim 1, wherein both ends of the middle U-shaped cover are respectively connected to the shell of the synchronous mechanism at the corresponding end through a connection structure, and the left support frame and the right support frame are provided with concession holes for giving way to the connection structure for the left support frame and the right support frame to rotate.

9. A mobile terminal having an inward-foldable flexible screen, wherein the mobile terminal is provided with the hinge according to claim 1, wherein the flexible screen is laid on the inner side of the hinge.

\* \* \* \* \*